United States Patent
Bartlett et al.

(10) Patent No.: US 10,064,178 B1
(45) Date of Patent: Aug. 28, 2018

(54) DYNAMIC RECONFIGURATION OF AIR INTERFACE TO PROVIDE TIME DIVISION MULTIPLEXED SUPPORT FOR MULTIPLE RADIO ACCESS TECHNOLOGIES

(71) Applicant: Sprint Spectrum L.P., Overland Park, KS (US)

(72) Inventors: Roger Bartlett, Merriam, KS (US); Lyle T. Bertz, Lee's Summit, MO (US); Ronald R. Marquardt, Woodinville, MA (US)

(73) Assignee: Sprint Spectrum L.P., Overland Park, KS (US)

( * ) Notice: Subject to any disclaimer, the term of this patent is extended or adjusted under 35 U.S.C. 154(b) by 190 days.

(21) Appl. No.: 15/188,712

(22) Filed: Jun. 21, 2016

(51) Int. Cl.
| | | |
|---|---|---|
| *H04W 24/02* | (2009.01) | |
| *H04W 72/04* | (2009.01) | |
| *H04B 7/26* | (2006.01) | |
| *H04W 4/06* | (2009.01) | |
| *H04W 88/10* | (2009.01) | |

(52) U.S. Cl.
CPC ........ *H04W 72/0446* (2013.01); *H04B 7/265* (2013.01); *H04B 7/2656* (2013.01); *H04W 4/06* (2013.01); *H04W 24/02* (2013.01); *H04W 72/048* (2013.01); *H04W 88/10* (2013.01)

(58) Field of Classification Search
CPC ............. H04W 16/14; H04W 72/0413; H04W 72/0486; H04W 72/082; H04W 88/06
See application file for complete search history.

(56) References Cited

U.S. PATENT DOCUMENTS

| | | | |
|---|---|---|---|
| 8,285,295 B2 | 10/2012 | Westerberg et al. | |
| 2010/0067469 A1 | 3/2010 | Gaal et al. | |
| 2010/0202379 A1* | 8/2010 | Luo ...................... | H04B 7/2656 370/329 |
| 2014/0200002 A1* | 7/2014 | Vangala ............ | H04W 52/0254 455/436 |
| 2017/0325246 A1* | 11/2017 | Agarwal ........... | H04W 72/0406 |

\* cited by examiner

*Primary Examiner* — Khaled Kassim
*Assistant Examiner* — Zhaohui Yang (57) ABSTRACT

A method and system for dynamically reconfiguring an air interface that defines a continuum of frames each divided into a sequence of transmission time intervals (TTIs). The air interface is initially configured according to a first radio access technology (RAT). The base station then detects that at least a threshold extent of wireless client devices (WCDs) served by the base station on the air interface support operation according to a second RAT. And in response, the base station reconfigures the air interface so that certain TTIs per frame instead operate on a second RAT, with the remaining TTIs per frame still operating on the first RAT. The base station then serves WCDs that support the second RAT in the TTIs now configured according to the second RAT, while continuing to serve other WCDs according to the first RAT in the remaining TTIs configured according to the first RAT.

20 Claims, 6 Drawing Sheets

DYNAMIC RECONFIGURATION OF AIR INTERFACE TO PROVIDE TIME DIVISION MULTIPLEXED SUPPORT FOR MULTIPLE RADIO ACCESS TECHNOLOGIES

BACKGROUND

A cellular wireless network may include a number of base stations that radiate to define wireless coverage areas, such as cells and cell sectors, in which wireless client devices (WCDs) such as cell phones, tablet computers, tracking devices, embedded wireless modules, and other wirelessly equipped communication devices, can operate. In turn, each base station may be coupled with network infrastructure, including one or more gateways and/or switches, that provides connectivity with one or more transport networks, such as the public switched telephone network (PSTN) and/or a packet-switched network such as the Internet for instance. With this arrangement, WCDs within coverage of the network may engage in air interface communication with a base station and may thereby communicate via the base station with various remote network entities or with other WCDs.

OVERVIEW

Each coverage area of a base station defines an air interface for carrying communications between the base station and WCDs, including downlink communications from the base station to WCDs and uplink communications from WCDs to the base station. The air interface of a coverage area could operate on a particular carrier, which could be frequency division duplex (FDD), defining separate frequency channels for downlink and uplink communication, or time division duplex (TDD), defining a frequency channel multiplexed over time between downlink and uplink use. Each such carrier or its individual frequency channel(s) could span a particular frequency bandwidth. Further, the base station could be arranged to serve a WCD on a single such carrier at a time or, with carrier aggregation service or the like, on multiple such carriers at a time.

A base station's air interface may be configured to operate according to a particular radio access technology (RAT) or air interface protocol, which could define specifics of how the air interface is structured and how communications over the air interface will occur. Examples of commonly known RATs include without limitation Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communication (e.g., GSM), WiFi. Further, RATs could differ from each other as flavors or variants of these or other technologies.

A representative RAT, for instance, could define how the air interface is configured in the time and frequency domain. By way of example, a RAT could provide that carriers will be of a particular bandwidth class, such as wideband (e.g., on the order of 1.4 MHz to 20 MHz each) or narrowband (e.g., on the order of 6 kHz to 25 kHz each). Further, a RAT could provide that, on a given carrier, the air interface will be divided over time and/or frequency into particular channels or other air interface resources for carrying communications between the base stations and WCDs. And the RAT could define the manner in which communications on such air interfaces will occur, such as what modulation scheme will be used to carry information on the air interface and how various resources will be allocated for instance. Other examples are possible as well.

In a representative system, a base station's coverage area may operate on a particular a carrier, and the air interface on that carrier may be configured to operate according to a RAT that defines a continuum of frames each divided over time into a sequence of transmission time intervals (TTIs), with the RAT further defining specific air interface structure and operation. Thus, in each TTI, the air interface would be structured and operate in accordance with that RAT. And as WCDs enter into such coverage, the WCDs may engage in signaling to be served by the base station in the coverage area, and the base station may then serve the WCDs over the air interface in accordance with the RAT.

With advances in wireless technologies, newer types of WCDs supporting different RATs have been developed or are envisioned. It would thus be advantageous to reconfigure base station air interfaces to support those different RATs. Unfortunately, however, reconfiguring a base station's air interface to have it be structured and operate in accordance with a new RAT could pose issues for WCDs that do not support that new RAT. For instance, WCDs that do not support the new RAT could lose the ability to be served by the base station, which could result in poor user experience.

Disclosed herein is a method and system that could help overcome this problem. In accordance with the disclosure, a base station will dynamically multiplex its air interface over time between two different RATs. For instance, if the air interface defines a continuum of frames each divided into a sequence of TTIs and all of the TTIs per frame operate on a first RAT, the base station could dynamically reconfigure the air interface so that certain ones of the TTIs per frame instead operate on a second RAT, with the remaining TTIs per frame still operating on the first RAT. In practice, the base station could carry out this process in response to determining that at least a threshold number of WCDs currently being served by the base station on the air interface support operation according to the second RAT. And when the base station so reconfigures the air interface, the base station could cause the WCDs that support the second RAT to be served in the TTIs that are now configured according to the second RAT, while continuing to serve one or more other WCDs according to the first RAT in the remaining TTIs that are configured according to the first RAT.

Accordingly, in one respect, disclosed is a method for dynamically configuring an air interface on which a base station serves WCDs, where the air interface defines a continuum of frames each divided into a sequence of TTIs, and where the air interface initially has a first configuration in which all of the TTIs per frame are configured according to a first RAT. The method includes the base station detecting that, when the air interface has the first configuration, at least a threshold number of WCDs served by the base station on the air interface support operation according to a second RAT different than the first RAT, where the threshold number is at least one. And the method further includes, responsive to at least the detecting, the base station automatically reconfiguring the air interface to have a second configuration different than the first configuration, including reconfiguring a proper subset of the TTIs per frame to be configured according to the second RAT rather than the first RAT and leaving a remainder of TTIs per frame configured according to the first RAT.

In another respect, disclosed is a base station arranged to dynamically reconfigure an air interface on which the base station serves WCDs, where the air interface defines a continuum of frames each divided into a sequence of TTIs, and where the air interface initially has a first configuration in which all of the TTIs per frame are configured according to a first RAT. The base station includes an antenna structure for engaging in communication on the air interface, and a controller that causes the base station to carry out operations to dynamically reconfigure the air interface. For example, the operations include detecting that, when the air interface has the first configuration, at least a threshold number of WCDs served by the base station on the air interface support operation according to a second RAT different than the first RAT, where the threshold number is at least one. And the operations further include, responsive to at least the detecting, automatically reconfiguring the air interface to have a second configuration different than the first configuration, where automatically reconfiguring the air interface to have the second configuration different than the first configuration comprises reconfiguring a proper subset of the TTIs per frame to be configured according to the second RAT rather than the first RAT and leaving a remainder of TTIs per frame configured according to the first RAT.

And in still another respect, disclosed is another method for dynamically reconfiguring an air interface on which a base station serves WCDs, where the air interface defines a continuum of frames each divided into a sequence of TTIs, and where the air interface initially has a first configuration in which each TTI per frame spans a single wide-band carrier defining a wide-band carrier bandwidth and the base station provides wide-band service in each TTI. The method includes the base station detecting that at least a threshold number of WCDs served by the base station support narrow-band service. And the method further includes, responsive to the detecting, the base station automatically reconfiguring a proper subset of the TTIs per frame to span multiple narrow-band carriers rather than the singe wide-band carrier and leaving a remainder of the TTIs per frame spanning the single wide-band carrier, where the base station then provides narrow-band in each TTI of the proper subset and continues to provide wide-band service in each TTI of the remainder.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

For purposes of illustration, the present disclosure will focus on an implementation where the base station's air interface is initially configured to operate in accordance with a traditional wideband-LTE RAT, and where the base station will dynamically reconfigure the air interface to have certain TTIs be configured to operate in accordance with another RAT different than the wideband-LTE RAT. However, it should be understood that the disclosed principles can be applied with respect to numerous other technologies, and that numerous variations from arrangements and operations described may therefore be possible, while remaining within the scope of the claims.

Figure 1:
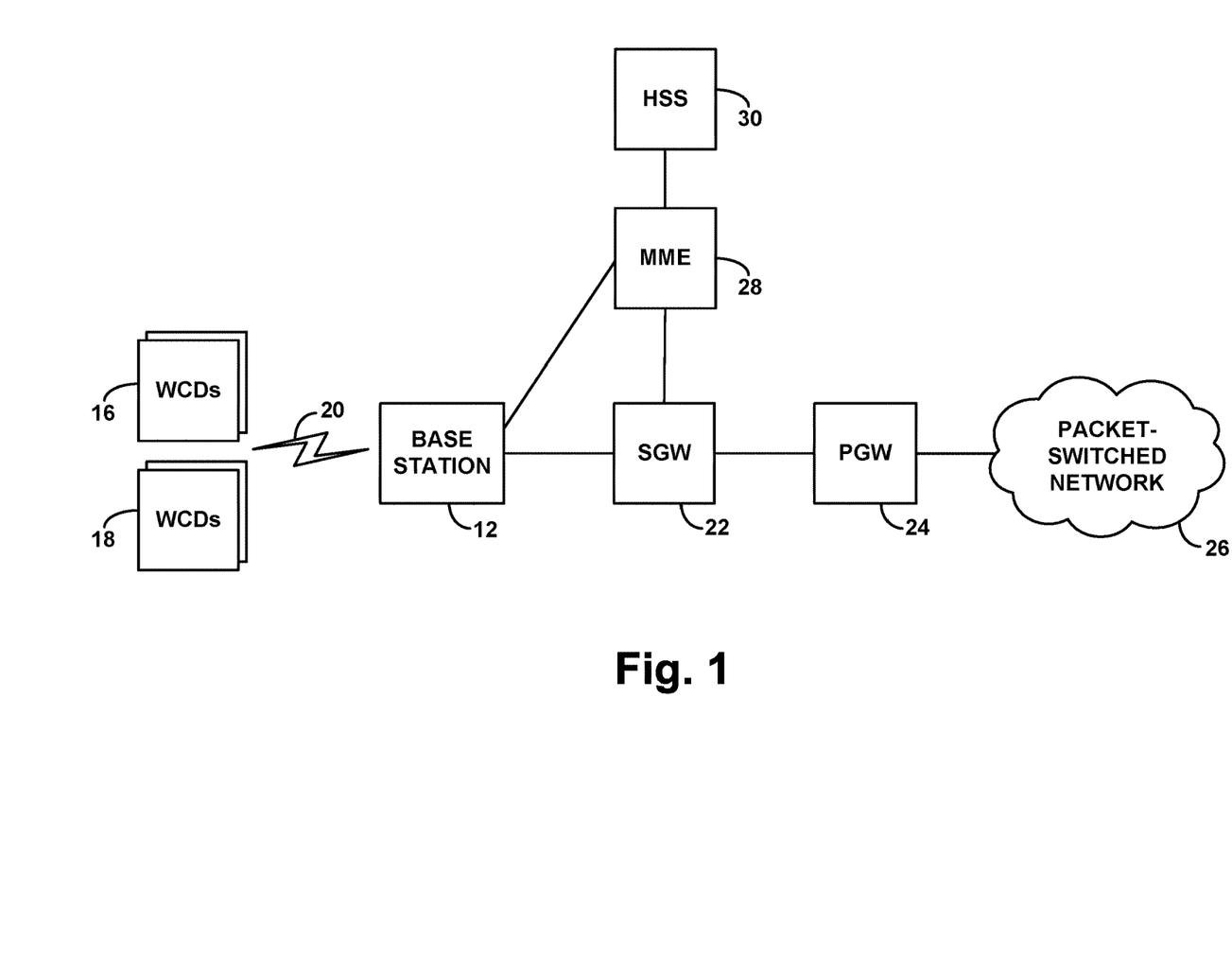
FIG. 1 is a simplified block diagram of an example network arrangement in which aspects of the present disclosure can be implemented.

Referring to the drawings, as noted above, FIG. 1 is a simplified block diagram of an example network arrangement in which aspects of the disclosure can be implemented. As shown in FIG. 1, the network arrangement includes a representative base station 12 that radiates to provide a wireless coverage area in which to serve WCDs 16, 18, with the wireless coverage area defining an air interface 20 between the base station and the WCDs. Further, the base station 12 has a communication interface with a serving gateway (SGW) 22, and the SGW has a communication interface with a packet-data network gateway (PGW) 24 that provides connectivity with a packet-switched network 26 such as the Internet. And the base station has a communication interface with a mobility management entity (MME) 28, which has communication interfaces with the SGW and with a home subscriber server (HSS) 30, and which functions as a signaling controller in the network.

Configured as a wideband-LTE air interface, the air interface in this arrangement spans a wideband carrier, such as a carrier having a bandwidth of 1.4 MHz, 3 MHz, 5 MHz, 10 MHz, 15 MHz, or 20 MHz, to facilitate providing WCDs with high speed data communication service. In accordance with an example implementation of LTE, the air interface on that carrier defines a continuum of 10-millisecond frames each divided into a sequence of 1-millisecond subframes or TTIs. Each TTI is then further divided over time into 14 OFDM symbol segments of 0.67 microseconds each, and the carrier is divided into subcarriers spaced apart from each other by 15 kHz. Thus, in each TTI, the air interface defines a matrix of resource elements each 0.67 microseconds by 15 kHz.

In each TTI, various resource elements are reserves to define physical channels for carrying particular types of signals or information between the base station and WCDs. On the downlink, for instance, with some exceptions, (i) certain resource elements distributed throughout the TTI carry a reference signal that WCDs can measure as a basis to detect and evaluate coverage strength, (ii) the first one to three symbol segments per TTI define a downlink control region for carrying resource-scheduling directives and other control signaling, and (iii) remaining resource elements per TTI define a physical downlink shared channel (PDSCH), with the resource elements being grouped into physical resource blocks (PRBs) each 12 subcarriers wide, for carrying bearer data and other information to WCDs in accordance with resource-scheduling directives or the like. And on the uplink, also with some exceptions, (i) certain resource elements per TTI at the beginning and end of the carrier define an uplink control region for carrying certain uplink control signaling such as channel quality reports and scheduling requests, and (ii) remaining resource elements per TTI define an physical uplink shared channel (PUSCH), with resource elements being likewise grouped into PRBs for carrying bearer data or the like.

In this example arrangement, as each WCD initially enters into coverage of the base station 12, the WCD could detect coverage on a particular wideband LTE carrier, and the WCD and network could engage in an attachment process through which the WCD registers to be served by the network and the network prepares to serve the WCD. In particular, the WCD and base station could first engage in access and radio resource control (RRC) signaling on the detected carrier, to establish a radio-link-layer connection over the air interface through which the base station can then serve the WCD. Once that RRC connection is established, the WCD could then transmit an attach request via the connection, which the base station could forward to the MME. The MME could then work with the HSS to facilitate authentication and authorization of the WCD and to obtain a service profile record for the WCD. And the MME could then work with the base station and the SGW to establish for the WCD one or more bearer connections extending between the base station and the PGW.

Once the WCD is so attached, the base station could then serve the WCD with data communications over the air interface, with data being modulated into symbols using a data modulation and coding scheme (MCS) and symbols then being modulated onto the air interface using an air interface modulation scheme. In particular, the MCS could be selected based on the WCD's reported channel quality so as to have each symbol represent more or fewer bits of data depending on the WCD's channel quality. And wideband LTE then typically uses orthogonal frequency division multiple access (OFDMA) for symbol transmission on the downlink and single-carrier frequency division multiple access (SC-FDMA) for symbol transmission on the uplink.

In practice, as the data for the WCD arrives at the base station via a bearer from the PGW and packet-switched network 26, the base station may schedule and provide transmission of the data to the WCD. In particular, the base station could determine an appropriate MCS based on the WCD's reported channel quality, and the base station could thereby determine how many resource elements and thus how many downlink PRBs would be required to transmit the data. The base station could the assign certain downlink PRB(s) in a TTI to carry at least a portion of the data to the WCD. And in that TTI, the base station could transmit to the WCD a downlink control information (DCI) message specifying the MCS and assigned PRB(s) and could transmit the data accordingly in the specified PRB(s), using OFDM air interface modulation.

Likewise, as the WCD has data to transmit on the packet-switched network 26, the WCD could transmit a scheduling request to the base station in a particular TTI and could provide the base station with a report of the quantity of data to be transmitted. The base station could then similarly determine an appropriate MCS based on the WCD's reported channel quality and determine many uplink PRBs would be required to transmit the data. The base station could the assign certain uplink PRB(s) in an upcoming TTI to carry at least a portion of the data from the WCD and could transmit to the WCD a DCI specifying the MCS and assigned PRB(s) of the upcoming TTI. In that upcoming TTI, the WCD could then transmit data accordingly in the specified PRB(s), using SC-FDMA air interface modulation.

As noted above, wideband LTE could facilitate high speed data communication service for WCDs. Examples of such service could include streaming audio and video communication, gaming communication, and other real-time media services commonly enjoyed by users. Wideband LTE, typically referred to as "4G LTE," allows for such high speed communication at least in party by defining a large number of assignable PRBs per TTI.

As further noted above, however, newer types of WCDs supporting different RATs have been developed or are envisioned. By way of example, and without limitation, there has been widespread development in the area of "Internet-of-Things" (IoT) communication. The IoT defines an arrangement in which computing devices, appliances, machines, animals, or other entities engage in data communication with each other without human or human-computer interaction. For instance, the IoT could encompass object-tracking devices, home automation devices, environment-monitoring devices, and other devices or systems, which might exchange sensor reports, control directives, and other data with each other.

Such IoT devices could have integrated WCD modules that can be served by a base station, to facilitate communication with other IoT entities or the like via a packet-switched network. However, it may not be necessary or appropriate for IoT devices to be served with wideband LTE. For one thing, such devices may not have a need for the high bandwidth data service offered by wideband LTE, as they may instead typically engage in small amounts of data communication, such as sensor reporting, control signaling, or the like, without user expectations of high-speed data service. Further, with the expected proliferation of such IoT devices, the number of such devices that may attach with a base station and all be served on a given carrier could overwhelm the signaling and traffic channels of the carrier, to the detriment of other WCDs.

It may therefore be preferable for IoT devices to be served in accordance with another RAT in which the air interface has different structure and operation. By way of example, it may be preferable for IoT devices to be provided with narrowband LTE service. Narrowband LTE service could operate in largely the same way as wideband LTE service as discussed above, except that the narrowband LTE carriers could be much smaller, on the order of 6.25 kHz to 25 kHz for instance. Further, aside from having spanning much less frequency, a narrowband LTE air interface could be configured differently than a wideband LTE air interface in other ways, such as by having different channel configurations per TTI (e.g., with different resource element allocations for control regions and shared channel regions, with fewer sub-carriers per PRB, etc.), and possibly having different (e.g., shorter or longer) frame and/or TTI durations.

More generally, it may be preferable to serve IoT devices and/or other specific types of WCDs (e.g., particular makes, models, or other categories or classes of devices of WCDs) on air interfaces configured in any of a variety of ways that differ from the existing configuration of the base station's air interface. Without limitation, examples of differences in air interface configuration could include (i) different carrier bandwidth, (ii) different TTI duration, (iii) different air interface modulation, (iv) difference in whether the downlink and uplink use the same air interface modulation as each other, (v) different structure and/or sizing of air interface resource elements and/or resource blocks or the like, (vi) different configuration of air interface channels, (vii) different methods for scheduling air interface resource use, such as difference in whether WCDs would request scheduling before transmitting data, and other differences now known or later developed.

Yet as noted above, it could be problematic to simply reconfigure a base station's air interface to be configured in accordance with a new RAT, at a minimum because doing so could prevent WCDs that do not support the new RAT from being served on the air interface.

Instead, as explained above, the present disclosure provides for a base station dynamically reconfiguring its air interface in way that could allow more gradual transition from one RAT to another. In particular, in accordance with the disclosure, the base station could detect that a threshold extent of WCDs served by the base station support operation in accordance with the new RAT, and the base station could then responsively reconfigure the air interface to time division multiplex operation of the air interface between the old RAT and the new RAT. The base station could thus serve the WCDs that support the new RAT in air interface air interface time segments configured to operate according to the new RAT, and the base station could continue to serve other WCDs (e.g., those that do not support the new RAT) in air interface time segments that remain configured to operate according to the old RAT.

In the arrangement of FIG. 1, WCDs are shown in two groups, 16 and 18, to help illustrate this. WCDs 16 could be legacy devices that support wideband LTE but do not support the new RAT (such as narrowband LTE), whereas WCDs 18 could be newer or otherwise different types of devices (e.g., IoT devices) that support the new RAT and may also support wideband LTE in whole or in part. In practice, WCDs 16 and 18 could all be configured to detect and attach with a base station such as base station 12 on the wideband LTE air interface, such as to detect a wideband LTE reference signal, to engage in access, RRC, and attach signaling, and so forth. Further, once attached or the like, all of the WCDs could be configured to be served fully on the wideband LTE an air interface as discussed above. Alternatively, just WCDs 16 could be configured to then be served by the base station on the wideband LTE air interface, and WCDs 18, though attached, could remain in an RRC idle state not yet engaging in bearer data communication over the air interface on grounds that the air interface is not configured in accordance with the new RAT.

The base station may operate by default with its air interface fully configured for wideband LTE operation as described above. Yet the base station could also broadcast in a system parameter message (e.g., a system information block (SIB) message) an indication that the base station also supports the new RAT. This broadcast indication could specify the new RAT by name or code in a manner that could be understood by WCDs. WCDs 18 could thus read this broadcast indication to determine that the base station supports the new RAT, which could be a basis for WCDs 18 deciding to be served by the base station as opposed to another base station that does not indicate support for the new RAT.

In operation, the base station could then at some point detect that at least a threshold extent of WCDs that the base station serves support operation in accordance with the new RAT. The threshold extent could be one WCD or could be a designated quantity that is at least one. For instance, the question could be whether the base station serves at least two such devices, at least three such devices, or the like. Alternatively, the threshold could be a relative value, such as a threshold percentage of WCDs served. For instance, the question could be whether at least 25% of the base station's served WCDs support operation in accordance with the new RAT, whether at least 50% of the base station's served WCDs support operation in accordance with the new RAT, or the like.

At issue here could be how many WCDs currently served by the base station (for instance, without limitation, WCDs that are actually attached and have an RRC connection with the base station, whether in RRC idle or RRC connected mode) support operation in accordance with the new RAT. The base station could make this determination itself and/or with the help of one or more other entities (e.g., with the help of the MME), by reference to context or profile records for the attached WCDs, indicating WCD capabilities such as which RAT(s) the WCDs are configured to support. These profile records could be populated based on capability information supplied by the WCDs during attachment and/or based on information from the HSS or another source. Referring to such profile records for the WCDs attached with the base station, the base station could thus whether at least a threshold number of the attached WCDs support the new RAT.

Further, detecting that the threshold extent of served WCDs support the new RAT could also take into account how active the served WCDs that support the new RAT are. For instance, the base station could detect that at least a threshold number of such WCDs are currently in an RRC connected mode and/or have communicated at least a threshold quantity of data over the air interface in a last sliding-window of time. Other variations are possible as well.

Alternatively, detecting that at least a threshold extent of WCDs that the base station serves support operation in accordance with the new RAT could be done predictively, based on historical service information on a per time-of-day basis or the like. For instance, the base station could keep records of how many such WCDs the base station serves, and perhaps their level of activity, on a per time-of-day basis, and could thus develop statistics that indicate that at particular times of day the base station tends to serve more or fewer such devices. Based on the current time of day, the base station could then predict, in line with those statistics, what the likely number of such served WCDs will be.

When the base station detects that at least a threshold extent of WCDs that the base station serves support operation in accordance with the new RAT, the base station could then automatically reconfigure its air interface to time division multiplex between operation according to wideband LTE and operation according to the new RAT. On an FDD or TDD carrier, the base station may do this on the downlink channel (e.g., having some downlink time segments be configured for one RAT others be configured for the other RAT), on the uplink channel (e.g., having some uplink time segments be configured for one RAT and others be configured for the other RAT), or on both the downlink and uplink channel.

The base station could carry out this reconfiguration on a TTI basis within each frame. For instance, in the wideband LTE arrangement discussed above where each frame is divided into a sequence of ten TTIs, the base station could designate a proper subset (some but less than all) of the ten TTIs per frame to be reconfigured to operate in accordance with the new RAT, while leaving the remainder of the TTIs per frame configured to operate in accordance with wideband LTE. Further, the base station could decide how many of TTIs per frame to reconfigure to operate in accordance with the new RAT, based on how many (e.g., what portion) of the base station's currently served WCDs support the new RAT. For instance, the base station could have different preset mappings between percentage of served WCDs that support the new RAT and quantity of TTIs to be reconfigured to operate in accordance with the new RAT.

The base station could also broadcast an indication of which of the TTIs per frame are or will be reconfigured to operate in accordance with the new RAT, indicating implicitly or expressly that the remainder of the TTIs per frame are configured to operate in accordance with wideband LTE.

The base station could broadcast this indication before making the change, or the base station could provide this indication upon or after the base station makes this change, so that currently served and newly arriving WCDs can operate accordingly. Further, the broadcasting of this indication could be done with a SIB message or the like, or through multiple uncast signaling messages (e.g., RRC connection reconfiguration messages). To the extent appropriate, the base station could also specifically direct WCDs such as WCDs 18 to change their mode of operation, so that they can then be served in the TTIs configured in accordance with the new RAT rather than (or possibly in addition to) the TTIs configured in accordance with wideband LTE.

Figure 2:
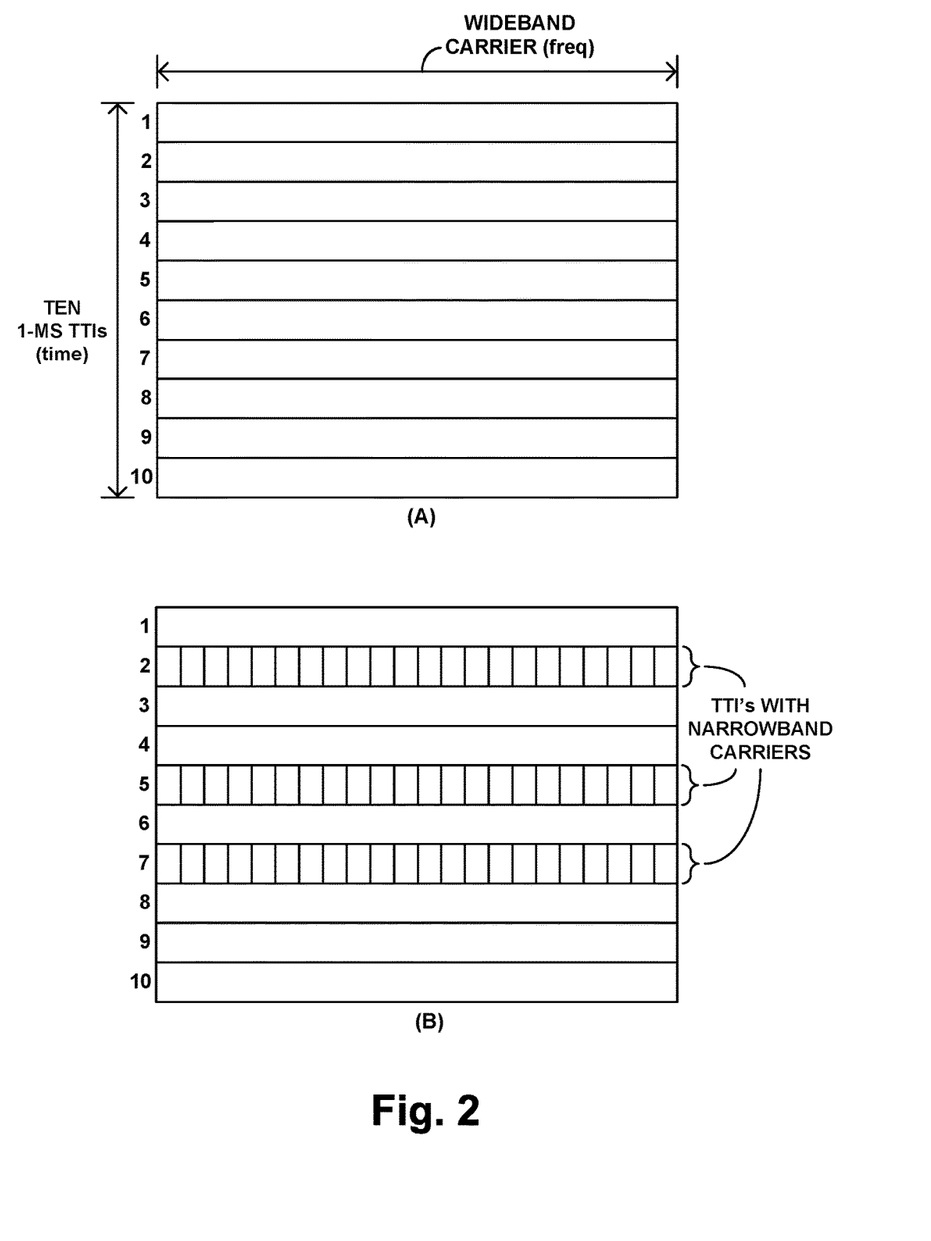
FIG. 2 is a depiction of an example air interface reconfiguration in accordance with the disclosure.
Figure 3:
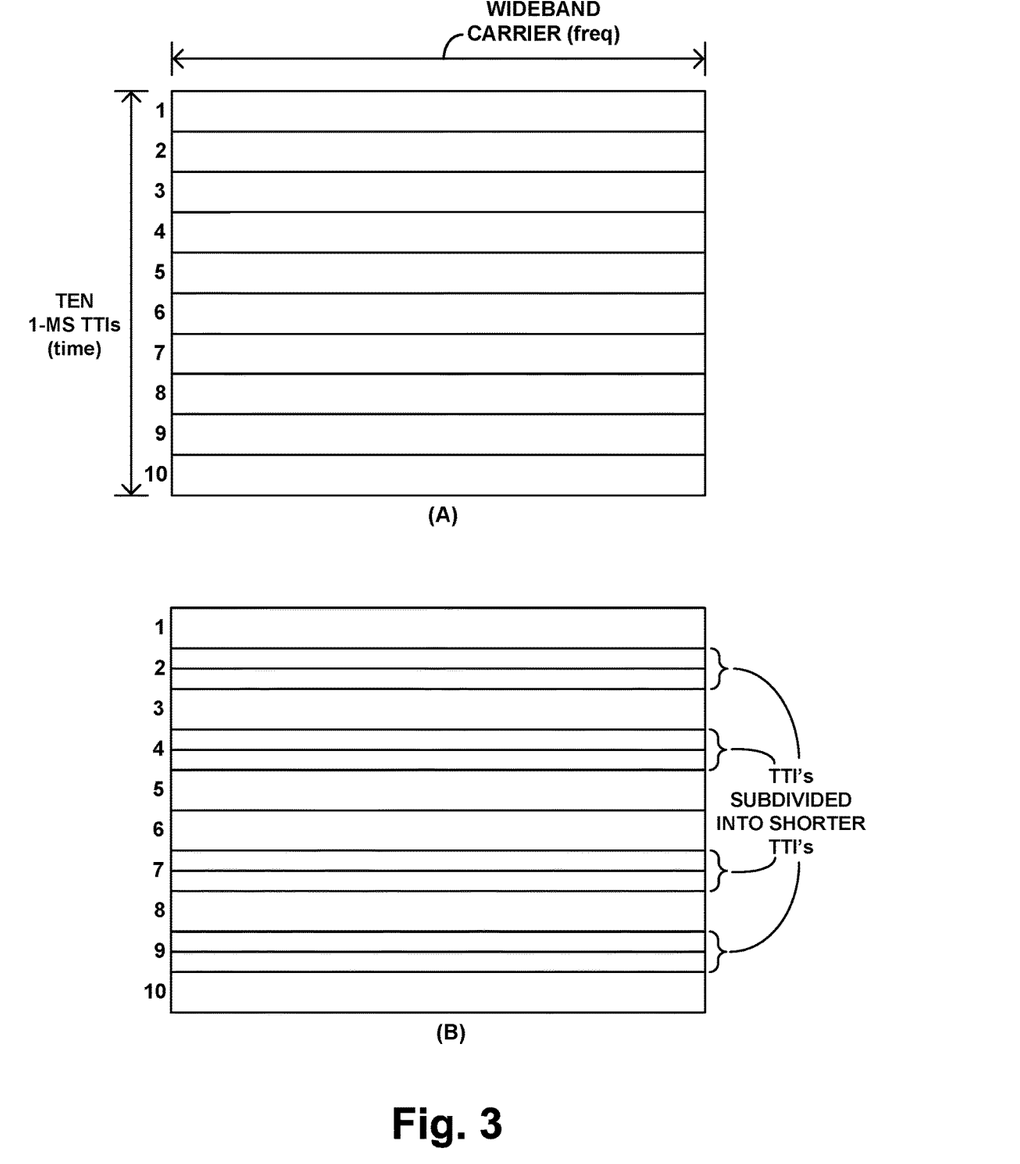
FIG. 3 is a depiction of another air interface reconfiguration in accordance with the disclosure.

FIGS. 2 and 3 depict two example reconfigurations of the air interface to help illustrate how this could work in practice.

FIG. 2 first depicts an example reconfiguration of a proper subset of TTIs from wideband LTE to narrowband LTE. In particular, FIG. 2 depicts two representative 10-millisecond frames, A and B, on an FDD downlink, with frame A being representative of the continuum of air interface frames before the reconfiguration, and frame B being representative of the continuum of air interface frames after the reconfiguration. Frame A is shown divided into ten 1-millisecond TTIs, with the air interface spanning a single wideband LTE carrier in all of TTIs. Whereas frame B is shown with a proper subset of TTIs (here three for example) reconfigured in accordance with an example of narrowband LTE; in particular, TTIs 2, 5, and 7 are shown reconfigured to define numerous narrowband carriers instead of just the single wideband carrier. (A relatively small number of such narrowband carriers are illustrated for simplicity; in actuality, the number could be on the order of hundreds or thousands.)

In this example, the base station's air interface may be initially configured with each frame like frame A. Upon detecting that a threshold extent of served WCDs support narrowband LTE (e.g., detecting that a threshold extent of served WCDs are IoT devices), the base station may then reconfigure the air interface so that each frame is then like frame B. Further, the base station may notify WCDs of this change, and the base station may direct each of WCDs 18 to change the carrier on which the WCD 18 operates, namely, to transition (e.g., hand over) from operating on the wideband carrier to operating on a designated one of the narrowband carriers, such as by transmitting to each such WCD an RRC connection reconfiguration message directing the change and thus causing reconfiguration of each such WCD's operation. Each such WCD 18 may then operate on its new narrowband carrier in each TTI now configured for narrowband LTE operation, and so the base station may schedule and engage in data communications with each such WCD's narrowband carrier in just each TTI so configured. Yet the base station may continue to serve each of WCDs 16 in the remaining TTIs per frame, in the same way as before on the wideband carrier, but interacting with those WCDs 16 in just the TTIs that remain configured for wideband LTE operation.

The narrowband carriers in this implementation are to be distinguished from mere sub-carriers of the type discussed above. A carrier defines the scope of frequency bandwidth on which the base station serves a WCD and may therefore define how much frequency bandwidth the WCD needs to search for control signaling from the base station and how much frequency bandwidth is available for potential allocation to the WCD and perhaps other WCDs for air interface communication. Whereas, a sub-carrier in LTE operation as discussed above is defined within a carrier as an attribute of an allocable resource such as a resource element or PRB. Further, depending on the RAT, a WCD could hand over from one carrier to another, whereas a WCD would not hand over between sub-carriers.

FIG. 3 depicts an example reconfiguration of a proper subset of TTIs to be shorter TTIs. In particular, FIG. 3 depicts frame A as in FIG. 2 and then depicts frame B in which a proper subset of TTIs (here four for example) are reconfigured to define a greater number of TTIs as separate respective communication instances. Here, the base station may so reconfigure the air interface upon detecting that a threshold number of served WCDs support operation with a RAT that has such shorter TTIs, perhaps to facilitate more granular (in time) management of scheduling and allocation of resources. (Alternatively, the base station could just as well combine consecutive TTIs of the proper subset to establish larger TTIs, which could support larger data transport block sizes for instance.) Thus, upon so reconfiguring the air interface, the base station could notify its WCDs, and the base station could then serve the WCDs that support the new RAT in the newly reconfigured TTIs per frame, while continuing to serve other WCDs under the old RAT in the remaining TTIs.

Other examples of dynamic air interface reconfiguration in line with the changes discussed above, and/or in line with other changes, could be possible as well.

Figure 4:
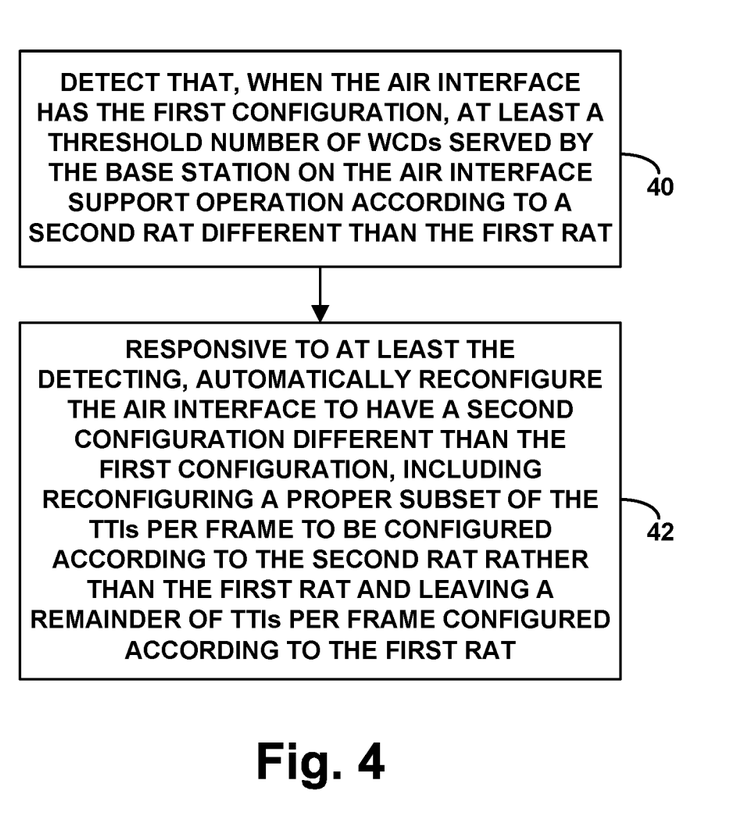
FIG. 4 is a flow chart depicting operations that can be carried out in accordance with the disclosure.

FIG. 4 is next a flow chart depicting operation of an example method in accordance with the disclosure, to dynamically configure an air interface on which a base station serves WCDs, where the air interface defines a continuum of frames each divided into a sequence of TTIs, and where the air interface initially has a first configuration in which all of the TTIs per frame are configured according to a first RAT. As shown in FIG. 4, at block 40, the base station detects that, when the air interface has the first configuration, at least a threshold number of WCDs served by the base station on the air interface support operation according to a second RAT different than the first RAT. And at block 42, responsive to at least the detecting, the base station automatically reconfigures the air interface to have a second configuration different than the first configuration, where automatically reconfiguring the air interface to have the second configuration different than the first configuration includes reconfiguring a proper subset of the TTIs per frame to be configured according to the second RAT rather than the first RAT and leaving a remainder of TTIs per frame configured according to the first RAT.

In this method, in each TTI of the air interface initially configured according to the first RAT, the base station could provide service on a wideband carrier spanning a first bandwidth. Further, in each TTI reconfigured according to the second RAT rather than the first RAT, the wideband carrier is divided into a plurality of narrowband carriers each spanning less than the first bandwidth, and the base station provides service separately on each of the narrowband carriers, to the extent the base station has service to provide on those carriers.

Further, in line with the discussion above, when the air interface has the first configuration in which all of the TTIs per frame are configured according to a first RAT, the base station could broadcast an indication that the base station supports operation according to the second RAT as well. And upon automatically reconfiguring the air interface to have the second configuration, the base station could broadcast an indication that the air interface has the second configuration, and/or the base station could transmit to one or more of the WCDs that support the second RAT a directive for each of the one or more WCDs to operate according to the second RAT. And still further, the base station could broadcast an indication of which TTIs per frame define the proper subset of TTIs, which could enable a determination (e.g., by currently served WCDs and/or newly arriving WCDs) of which TTIs per frame operate in the second configuration according to the second RAT rather than the first RAT.

Also in line with the discussion above, the act of reconfiguring the proper subset of the TTIs per frame to be configured according to the second RAT rather than the first RAT could involve selecting a quantity of TTIs per frame to be the proper subset of TTIs to be reconfigured, with the quantity being proportional to how many of the WCDs served by the base station support operation according to the second RAT.

Still further, in line with the discussion above, when the air interface has the first configuration, the base station could schedule air interface transmission according to the first RAT on a per TTI basis. And when the air interface is reconfigured to have the second configuration, the TTIs of the proper subset could be resized by at least combining or subdividing TTIs, and the base station could schedule air interface transmission according to the second RAT on one or more of the resized TTIs. Alternatively or additionally, the second RAT could provide for use of different air interface modulation than the first RAT.

In addition, as also discussed above, the act of detecting that at least the threshold number of WCDs served by the base station on the air interface support operation according to a second RAT different than the first RAT could involve detecting that at least the threshold number of WCDs actively engage in at least a threshold extent of communication served by the base station. And in that case, automatic reconfiguring of the air interface could be responsive to at least detecting that at least the threshold number of WCDs actively engage in at least the threshold extent of communication served by the base station. Further, the act of detecting that at least the threshold number of WCDs served by the base station on the air interface configured according to the first RAT support operation according to a second RAT different than the first RAT could be based on a current WCD-service information and/or could be predictive based on historical WCD-service information.

Yet additionally, after automatically reconfiguring by the base station the air interface to have the second configuration different than the first configuration, the base station could further automatically reconfigure (revert) the air interface back to the first configuration upon the base station detecting that a threshold low number of WCDs served by the base station on the air interface support operation according to the second RAT. For instance, the base station could do this upon detecting that the number of such served WCDs no longer at least the threshold that caused the initial reconfiguration, possibly allowing for a hysteresis. And here, the base station could again broadcast or otherwise provide an indication of the change, so that WCDs could be served accordingly.

Figure 5:
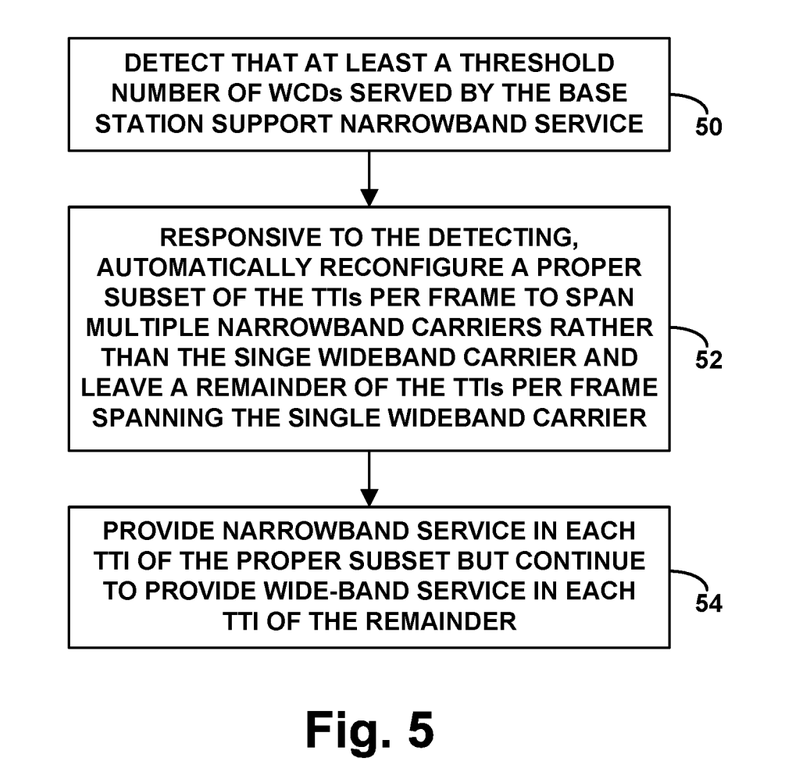
FIG. 5 is another flow chart depicting operations that can be carried out in accordance with the disclosure.

FIG. 5 is another flow chart depicting operation of an example method in accordance with the disclosure, to dynamically configure an air interface on which a base station serves WCDs, where the air interface defines a continuum of frames each divided into a sequence of TTIs, and where the air interface initially has a first configuration in which each TTI per frame spans a single wideband carrier defining a wideband carrier bandwidth and the base station provides wideband service in each TTI. As shown in FIG. 5, at block 50, the base station detects that at least a threshold number of WCDs served by the base station support narrowband service. At block 52, responsive to the detecting, the base station automatically reconfigures a proper subset of the TTIs per frame to span multiple narrowband carriers rather than the singe wideband carrier and leaves a remainder of the TTIs per frame spanning the single wideband carrier. And at block 54, the base station then provides narrowband service in each TTI of the proper subset but continues to provide wide-band service in each TTI of the remainder. This implementation could involve the LTE wideband and narrowband arrangements discussed above, or other wideband and/or other narrowband arrangements.

Figure 6:
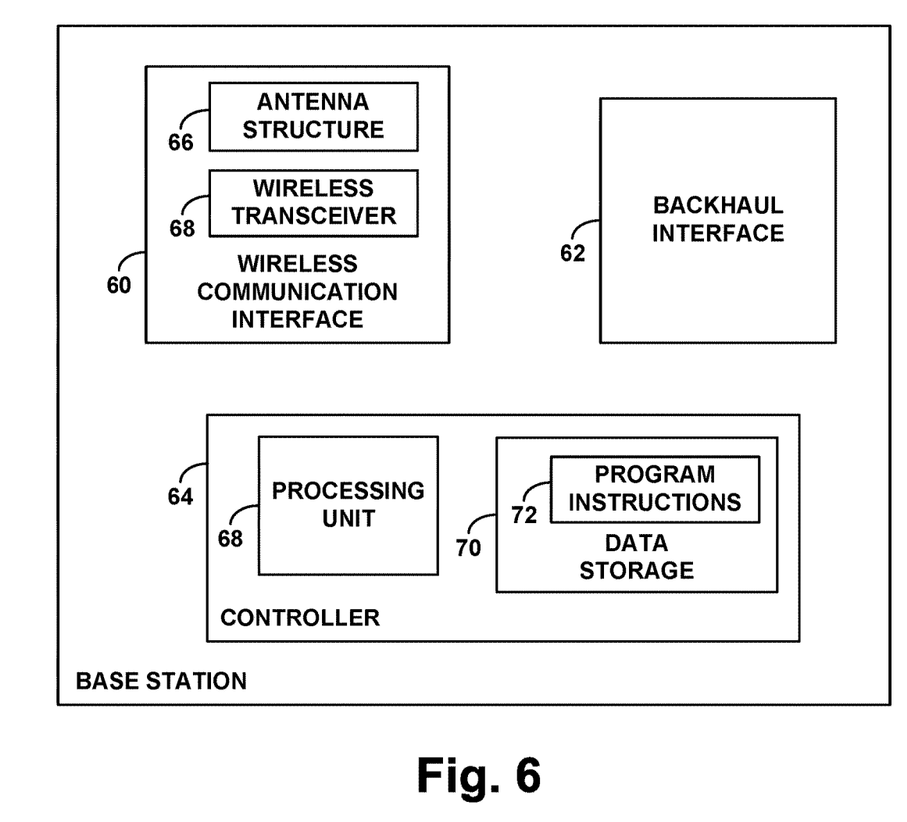
FIG. 6 is a simplified block diagram of a base station operable in accordance with the disclosure.

Finally, FIG. 6 is a simplified block diagram of an example base station, showing some of the components that such an entity could include to facilitate operations as discussed above for instance. This base station could generally take any of a variety of forms, including, for instance, a macro base station, a small cell base station, a relay base station, a femto base station, or the like. As shown, the example base station includes a wireless communication interface 60, a backhaul interface 62, and a controller 64.

The wireless communication interface 60 may include an antenna structure 66 configured for engaging in communication on the air interface, as well as a wireless transceiver 68 and associated equipment operable to provide the base station coverage area and thus to serve WCDs over the air interface as discussed above. The backhaul interface 62 may then comprise a wired or wireless network interface module for engaging in communication with other entities of the network, such as an SGW, an MME, and other base stations. And controller 64 may comprise a processing unit (e.g., one or more microprocessors or other types of processors) 68, data storage (e.g., one or more volatile and/or non-volatile non-transitory storage components, such as optical, magnetic, or flash storage) 70, and program instructions 72 stored in the data storage and executable by the processing unit to cause the base station to carry out operations such as those discussed above.

Exemplary embodiments have been described above. Those skilled in the art will understand, however, that changes and modifications may be made to these embodiments without departing from the true scope and spirit of the invention. For example, the principles discussed above could be extended to provide for time division multiplexing use of a carrier among other types of air interface configurations, such as providing an LTE air interface in certain TTIs per frame and a CDMA air interface in other TTIs per frame, among numerous other examples.

We claim:

1. A method for dynamically configuring an air interface on which a base station serves wireless client devices (WCDs), wherein the air interface defines a continuum of frames each divided into a sequence of transmission time intervals (TTIs), the method comprising:

detecting by the base station that, when the air interface has a first configuration in which all of the TTIs per frame are configured according to a first radio access technology (RAT), at least a threshold number of WCDs served by the base station on the air interface support operation according to a second RAT different than the first RAT, wherein the threshold number is at least one; and responsive to at least the detecting, automatically reconfiguring by the base station the air interface to have a second configuration different than the first configuration, wherein automatically reconfiguring the air interface to have the second configuration different than the first configuration comprises reconfiguring a proper subset of the TTIs per frame to be configured according to the second RAT rather than the first RAT and leaving a remainder of TTIs per frame configured according to the first RAT,
wherein reconfiguring the proper subset of the TTIs per frame to be configured according to the second RAT rather than the first RAT comprises selecting a quantity of TTIs per frame to be the proper subset of TTIs to be reconfigured, with the quantity being based on how many of the WCDs served by the base station support operation according to the second RAT.

2. The method of claim 1,
wherein, in each TTI of the air interface initially configured according to the first RAT, the base station provides service on a wideband carrier spanning a first bandwidth, and
wherein, in each TTI reconfigured according to the second RAT rather than the first RAT, the wideband carrier is divided into a plurality of narrowband carriers each spanning less than the first bandwidth, and the base station provides service separately on each of the narrowband carriers.

3. The method of claim 1, further comprising:
broadcasting by the base station an indication of which TTIs per frame define the proper subset of TTIs,
whereby the broadcasting of the indication enables a determination of which TTIs per frame operate in the second configuration according to the second RAT rather than the first RAT.

4. The method of claim 1, further comprising:
when the air interface has the first configuration in which all of the TTIs per frame are configured according to the first RAT, broadcasting by the base station an indication that the base station supports operation according to the second RAT as well.

5. The method of claim 4, further comprising,
upon automatically reconfiguring the air interface to have the second configuration, broadcasting by the base station an indication that the air interface has the second configuration.

6. The method of claim 4, further comprising:
upon automatically reconfiguring the air interface to have the second configuration, transmitting to one or more of the WCDs that support the second RAT a directive for each of the one or more WCDs to operate according to the second RAT.

7. The method of claim 1, wherein the quantity is proportional to how many of the WCDs served by the base station support operation according to the second RAT.

8. The method of claim 1,
wherein, when the air interface has the first configuration, the base station schedules air interface transmission according to the first RAT on a per TTI basis, and
wherein, when the air interface is reconfigured to have the second configuration, the TTIs of the proper subset are resized by at least combining or subdividing TTIs, and the base station schedules air interface transmission according to the second RAT on one or more of the resized TTIs.

9. The method of claim 1, wherein the second RAT provides for use of different air interface modulation than the first RAT.

10. The method of claim 1, wherein detecting that at least the threshold number of WCDs served by the base station on the air interface support operation according to a second RAT different than the first RAT comprises detecting that at least the threshold number of WCDs actively engage in at least a threshold extent of communication served by the base station,
wherein the automatic reconfiguring of the air interface is responsive to at least detecting that at least the threshold number of WCDs actively engage in at least the threshold extent of communication served by the base station.

11. The method of claim 1, further comprising:
after automatically reconfiguring by the base station the air interface to have the second configuration different than the first configuration, further reconfiguring by the base station the air interface back to the first configuration upon detecting by the base station that a threshold low number of WCDs served by the base station on the air interface support operation according to the second RAT.

12. The method of claim 1, wherein detecting by the base station that at least the threshold number of WCDs served by the base station on the air interface configured according to the first RAT support operation according to a second RAT different than the first RAT is based on a current WCD-service information.

13. The method of claim 1, wherein detecting by the base station that at least a threshold number of WCDs served by the base station on the air interface configured according to the first RAT support operation according to a second RAT different than the first RAT is predictive based on historical WCD-service information.

14. A base station arranged to dynamically reconfigure an air interface on which the base station serves wireless client devices (WCDs), wherein the air interface defines a continuum of frames each divided into a sequence of transmission time intervals (TTIs), the base station comprising:
an antenna structure for engaging in communication on the air interface; and
a controller that causes the base station to carry out operations to dynamically reconfigure the air interface,
wherein the operations include detecting that, when the air interface has a first configuration in which all of the TTIs per frame are configured according to a first radio access technology (RAT), at least a threshold number of WCDs served by the base station on the air interface support operation according to a second RAT different than the first RAT, wherein the threshold number is at least one, and
wherein the operations include, responsive to at least the detecting, automatically reconfiguring the air interface to have a second configuration different than the first configuration, wherein automatically reconfiguring the air interface to have the second configuration different than the first configuration comprises reconfiguring a proper subset of the TTIs per frame to be configured according to the second RAT rather than the first RAT and leaving a remainder of TTIs per frame configured according to the first RAT,
wherein reconfiguring the proper subset of the TTIs per frame to be configured according to the second RAT rather than the first RAT comprises selecting a quantity of TTIs per frame to be the proper subset of TTIs to be reconfigured, with the quantity being based on how many of the WCDs served by the base station support operation according to the second RAT.

15. The base station of claim 14, wherein the controller comprises a processing unit and program instructions stored in data storage and executable by the processing unit to cause the base station to carry out the operations.

16. The base station of claim 14,
wherein, in each TTI of the air interface initially configured according to the first RAT, the base station provides service on a wideband carrier spanning a first bandwidth, and
wherein, in each TTI reconfigured according to the second RAT rather than the first RAT, the wideband carrier is divided into a plurality of narrowband carriers each spanning less than the first bandwidth, and the base station provides service separately on each of the narrowband carriers.

17. The base station of claim 14,
wherein the operations further comprise causing the base station to broadcast an indication of which TTIs per frame define the proper subset of TTIs,
whereby the broadcast indication enables a determination of which TTIs per frame operate, in the second configuration, according to the second RAT rather than the first RAT.

18. The base station of claim 14, wherein the quantity is proportional to how many of the WCDs served by the base station support operation according to the second RAT.

19. The base station of claim 14, wherein the second RAT provides for use of different air interface modulation than the first RAT.

20. A method for dynamically reconfiguring an air interface on which a base station serves wireless client devices (WCDs), wherein the air interface defines a continuum of frames each divided into a sequence of transmission time intervals (TTIs), the method comprising:
the base station providing wideband service in each TTI per frame, wherein the air interface has a first configuration in which each TTI per frame spans a single wideband carrier defining a wideband carrier bandwidth;
detecting by the base station that at least a threshold number of WCDs served by the base station support narrowband service; and
responsive to the detecting, automatically reconfiguring by the base station a proper subset of the TTIs per frame to span multiple narrowband carriers rather than the singe wideband carrier and leaving a remainder of the TTIs per frame spanning the single wideband carrier, wherein the base station then provides narrowband service in each TTI of the proper subset and continues to provide wideband service in each TTI of the remainder.

* * * * *